H. Boardman,
Steam-Boiler Furnace.
No. 190.
Reissued Feb. 25, 1851.
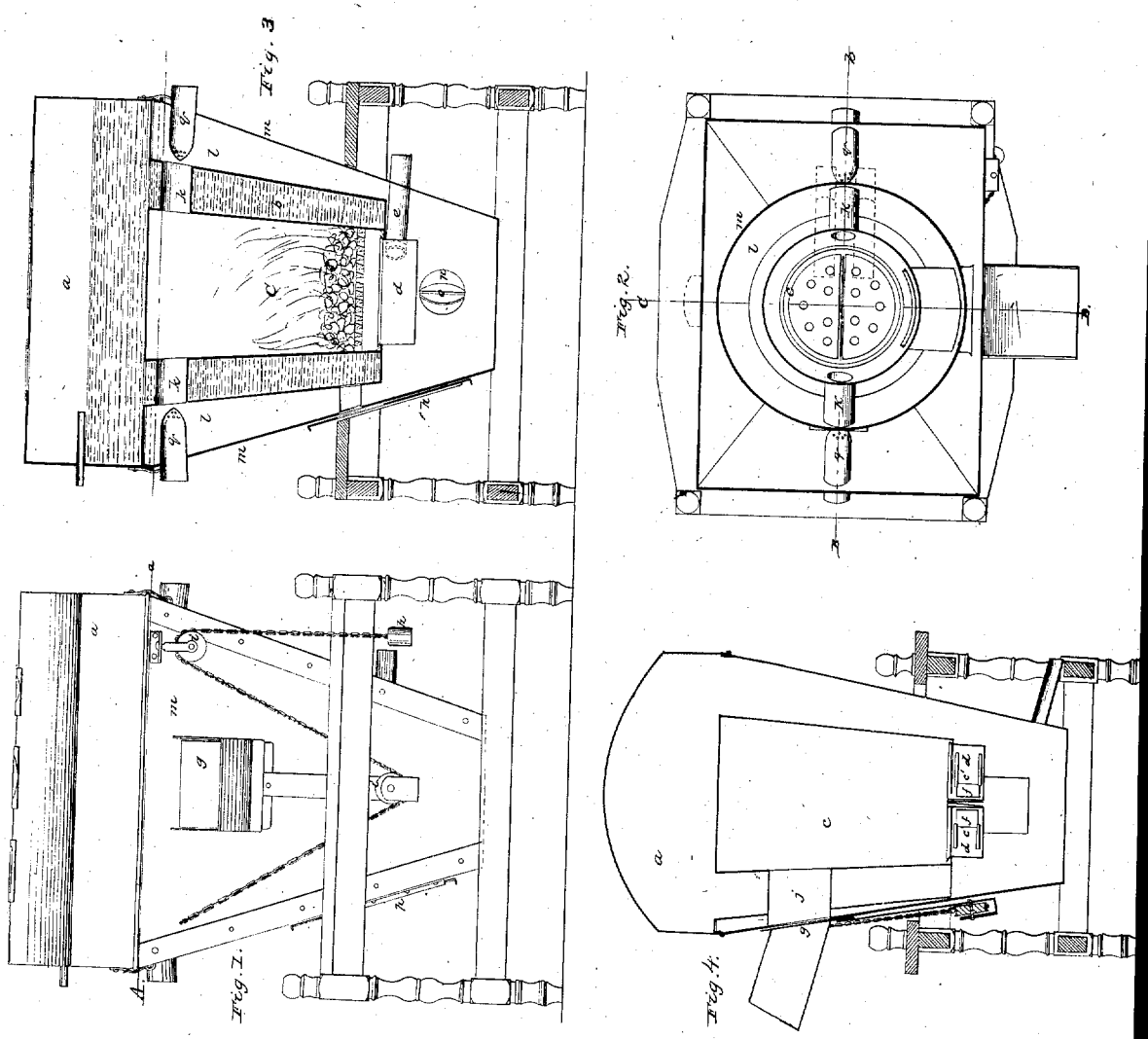

UNITED STATES PATENT OFFICE.

HORACE BOARDMAN, OF PLATTSBURG, NEW YORK.

STEAM-BOILER AND FURNACE.

Specification forming part of Letters Patent No. 6,649, dated August 14, 1849; Reissue No. 199, dated February 25, 1851.

*To all whom it may concern:*

Be it known that I, HORACE BOARDMAN, of Plattsburg, in the county of Clinton and State of New York, have invented certain new and useful Improvements in Steam-Boilers and Furnaces; and I do hereby declare that the following is a full, clear, and exact description of the principle or character which distinguishes them from all other things before known, and of the manner of making, constructing, and using the same, reference being had to the accompanying drawings, making part of this specification, in which—

Figure 1 is an elevation of the boiler and furnace; Fig. 2, a horizontal section taken at the line A *a* of Fig. 1, and Figs. 3 and 4 vertical sections taken at the lines B *b* and C *c* of Fig. 2.

The same letters indicate like parts in all the figures.

My invention consists in constructing the fire-chamber of a boiler and the surrounding water-space both of increased capacity at their upper extremities, where the heat is most intense, and in combining therewith a descending flue, by means of which the gaseous products of the combustion are conveyed downward, to be thence discharged into the chimney. The combustion of the fuel upon the grate within the fire chamber is excited by a blast introduced into the ash-pit beneath, and the combustible gases engendered by the burning fuel are thoroughly burned by jets of air, which are introduced into the upper part of the fire-chamber in such directions that they also retard the passage of the gases through the flues, and thus give them time to expend their heat. This retardation of the gases is increased by the action of a damper which is situated in the flue that conveys the spent gaseous products of the combustion to the chimney, and is partially closed to prevent their too rapid escape.

In the boiler represented in the accompanying drawings the water-space is divided into two distinct sections, the upper of which, *a*, forms the body of the boiler, and should be provided with man-holes, safety-valves, steam-pipes, and the other customary adjuncts of a steam-boiler, (which are not represented, as their construction and arrangement form no part of my invention.) The upper part of this section also forms the reservoir of steam or steam-chamber, in which the steam from the evaporating surface of the boiler accumulates, and whence it is conducted to the place where it is to be used. The lower section, *b*, of the water-space has the general form of an inverted hollow truncated cone or pyramid. It is connected with the upper section, *a*, in such manner that ample space is left for the passage of steam. The fire-chamber *c* has the general form of an inverted truncated cone or pyramid. It is closed at its top by the bottom of the upper section of the water-space and is enveloped by the lower section. It is fitted near its lower extremity with a grate of any suitable form, having an ash-pit, *d*, beneath it. The latter is represented in the present example as divided into two portions for the convenience of repairs and for facilitating the removal of ashes and cinders. It is fitted with a pipe, *e*, which conducts to it the blast by means of which the combustion of the fuel upon the grate is excited, and with doors, *ff*, to prevent the escape of the blast. The fuel is introduced into the fire-chamber through a chute or fire-hole, *j*, which extends through the water-space and is closed by a sliding door, *g*, whose weight is counterbalanced by a counterpoise, *h*. The flame and gases pass from the upper part of the fire-chamber through suitable passages, *k*, in the lower section of the water-space, to the descending flue, which conducts them to a chamber beneath the ash-pit. This descending flue is of enlarged capacity at its upper extremity where it receives the flame and gases from the passages *k*. Below this point it is contracted. It should be enveloped in a casing of some bad conductor of heat. The chamber in which the descending flue terminates, and which I shall call the "gas-chamber," constitutes the lowest part of the boiler. In the present example it is formed of iron plate. It must be furnished with a flue, *n*, which communicates with the chimney, and is fitted with a damper, *o*, by means of which the escape of the gases can be regulated. This chamber must also be provided with an aperture, which is fitted with a door, *p*, in order that access may be had to the ash-pit, and that the sparks and ashes which lodge in the chamber may be cleaned out with facility. At each of the passages *k* a tuyere, *q*, is protruded, through which a blast of air is introduced into the gases evolved from the burning fuel. The inner extremities of these tuyeres are rounded, and are pierced with small holes to diffuse the blast in fine jets. If it be found expedient, the fire-chamber may be lined with fire-bricks or some other refractory substance to prevent the fire from affecting the plates of the boiler.

When the blowing apparatus is to be operated by the steam generated in the boiler, then either the tuyeres which supply the blast to the grate should be so constructed as to admit of being disconnected to admit a draft of air to the grate, or a separate pipe should be made for that purpose. The combustion in the fire-chamber excited by the action of the blast introduced in the wind-chest below the grate evolves the flame and inflammable gases which fill the fire-chamber, and communicates an intense heat to that part of the boiler which forms the top of the fire-chamber, and also to the inner side of the surrounding water-space. The flame and the gaseous products of the combustion are forced upward and outward through the passages *k*, and as they pass upward and outward their currents are broken by the blasts of atmospheric air from the tuyeres or blast-pipes *q*, which have the effect thoroughly to commingle the atmospheric air and the inflammable gases at a high temperature, and thus to inflame them and consume all or nearly all the combustible matter. The natural course of the gases produced by the combustion of the fuel on the grate is upward, and consequently an accumulation of the hottest portions will take place at the upper part of the fire-chamber, and through the passages *k* in the upper part of the descending flue. The heat at these portions of the boiler is further increased by the consumption of the inflammable gases effected by the introduction of air through the tuyeres *q*. The introduction of air at this part of the boiler not only increases the intensity of the flame, but also increases the volume of the gases, thus rendering necessary a corresponding increase in the area of the fire-chamber and descending flue at these points. As the gases descend the flue, their heat is gradually absorbed and their volume correspondingly diminished thus requiring a corresponding diminution in the area of the descending flue, which in the present example is effected by giving it the form of a hollow inverted cone or pyramid, whose thickness is greatest where its upper end adjoins the lower part of the main boiler. By this arrangement of boiler and this method of burning the fuel a more intense heat is given out above than below; hence the water in the lower or colder portions of the water-space does not circulate with that contained in the upper or hotter parts of the boiler, but is kept moving slowly upward by the action of the feed alone, which is introduced in the lowest or coldest part of the boiler. The force of the blast from the wind-chest upward through the grate forces the ashes and sparks up to and through the passages *k*, and thence they fall by gravitation through the descending flue, and are deposited at the bottom of the gas-chamber below the exit-pipe, where the sparks are extinguished by the carbonic-acid gas, which is always present in this part of the apparatus when in operation. The products of the combustion as they pass down by pressure toward the exit-pipe after acting on every part of the boiler finally act on and heat the air which is blown into the ash-pit, and as the gases are retained within the gas-chamber under pressure that part of the chamber below the ash-pit will always be filled with heated gases to keep up the required temperature of the ash-pit.

I do not wish to limit myself to the number of tuyeres for the introduction of the blast of atmospheric air either to the fuel on the grate or to the gases issuing from the fire-chamber into the descending flue; nor do I wish to limit myself to the special form of boiler, the fire-chamber, water-casing, or descending flue, as these may be varied at pleasure so long as the principle or character of my invention is retained.

What I claim as my improvement in steam-boilers, and desire to secure by Letters Patent, is—

1. The combination of a fire-chamber and a water-casing, the upper horizontal sections of both of which are greater than their lower, with a descending flue, the fire-chamber and water-casing being so arranged with respect to each other that the larger sections of the one adjoin the larger sections of the other, substantially in the manner and for the purposes herein set forth.

2. The injection of a jet or jets of air at the flues or passages which connect the combustion-chamber with the descending flue for the purpose of igniting the gases and retarding their progressive motion toward the bottom of the gas-chamber.

In testimony whereof I have hereunto subscribed my name.

HORACE BOARDMAN.

Witnesses:

A. M. COTTER,

ROBERT BEGGS.